United States Patent [19]

Gmunder et al.

[11] Patent Number: 5,045,115
[45] Date of Patent: Sep. 3, 1991

[54] METHOD FOR TREATING SOLID RESIDUES CONTAINING HEAVY METALS FROM COMBUSTION PLANTS

[75] Inventors: Arnold Gmunder, Seuzach; Jurgen Gnieser, Zurich; Jorg Wiedersheim, Wangen, all of Switzerland

[73] Assignee: Sulzer Brothers Limited, Winterthur, Switzerland

[21] Appl. No.: 412,182

[22] Filed: Sep. 25, 1989

[30] Foreign Application Priority Data

Sep. 28, 1988 [CH] Switzerland .......... 3605/88

[51] Int. Cl.$^5$ .......... B09B 3/00; C22B 7/02; C04B 18/04
[52] U.S. Cl. .......... 106/709; 423/1; 423/DIG. 20; 210/912; 210/914
[58] Field of Search .......... 423/92, 101, 104, 109, 423/98, 1, DIG. 20; 210/724, 726, 710, 712, 713, 727, 728, 768, 770, 751, 912, 914, 804, 772; 422/187, 188; 106/709

[56] References Cited

U.S. PATENT DOCUMENTS

| | | | |
|---|---|---|---|
| 4,025,430 | 5/1977 | Pagel | 210/710 |
| 4,049,545 | 9/1977 | Horrath | 210/724 |
| 4,348,228 | 9/1982 | Zarur | 423/109 |
| 4,465,597 | 8/1984 | Herman et al. | 210/713 |
| 4,617,180 | 10/1986 | Vogg | 423/92 |

FOREIGN PATENT DOCUMENTS

| | | |
|---|---|---|
| 58-102272 | 6/1978 | Japan .......... 210/768 |
| 585062 | 2/1977 | Switzerland . |
| 1435296 | 5/1976 | United Kingdom . |

Primary Examiner—Michael L. Lewis
Assistant Examiner—Peter DiMauro
Attorney, Agent, or Firm—Kenyon & Kenyon

[57] ABSTRACT

In the treatment of solid residues containing heavy metals from combustion plants, the heavy-metal compounds dissolved after washing-out and subsequently precipitated are separated from the solvent, usually water or slightly acid aqueous solutions by cross-current diaphragm filtration. The sludge obtained during filtration and comprising precipitated insoluble heavy-metal compounds is dewatered together with the remaining solid residues and made suitable for dumping, e.g. by using binders. The cross-current diaphragm filter improves the washing of heavy metals out of the washing or waste water, and the method and the associated plant are simplified by the joint processing of the sludges containing solids.

7 Claims, 1 Drawing Sheet

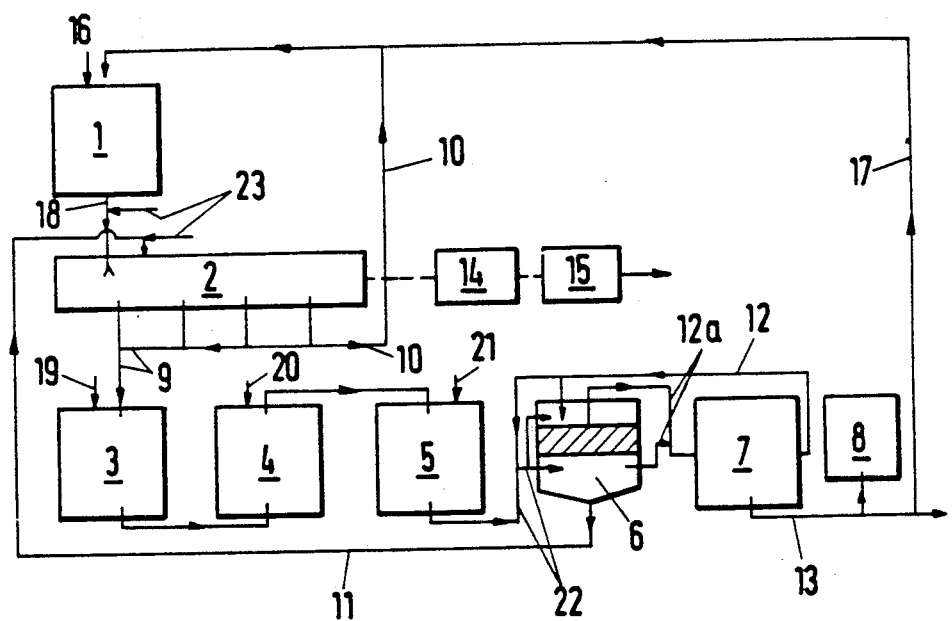

METHOD FOR TREATING SOLID RESIDUES CONTAINING HEAVY METALS FROM COMBUSTION PLANTS

This invention relates to a method and apparatus of treating solid residues containing heavy metals from combustion plants.

As is known, solid residues, i.e. ashes, from combustion plants, particularly plants for burning dust and special rubbish, sintering plants, thermal power stations and industrial combustion plants, contain heavy metals such as cadimum (Cd), lead (Pb), zinc (Zn), mercury (Hg), nickel (Ni) or copper (Cu). These heavy metals must be removed from the residues before they are deposited in a dump, after treatment with additives, e.g. binders such as concrete or bitumen. There are therefore known methods for at least substantially removing heavy metals from the solid residues, by solution followed by precipitation, e.g. by adding hydroxides or sulphides, and for converting the heavy metals into a form insoluble in water or acid solutions and likewise treating them with binders before they, like the solid residues freed from them, are deposited in a dump.

In one known method, the precipitated insoluble heavy-metal concentrates have hitherto been separated from liquid solvents in fixed-bed filters using granular filter materials. Conventionally, the sludge and precipitated heavy metals are dewatered and dumped separately from the original solid residues. Very frequently, the heavy-metal sludge has to be deposited in special waste dumps.

Due to the increasingly strict regulations regarding the maximum permissible concentration of heavy metals in the waste water from the aforementioned washing plants for ashes, difficulties occur in the known plants with regard to separation of precipitated heavy metals from the "washing water", since the "discrimination" of previously-used filters is no longer adequate.

Accordingly, it is an object of the invention to improve the "discrimination" of filters when separating precipitating heavy metals.

It is another object of the invention to simplify the method and installations for removing heavy metals from solid residues from combustion plants.

Briefly, the invention provides a method and apparatus for treating solid residues containing heavy metals from combustion plants.

The method includes the initial step of washing the residues with water in a washing stage in order to dissolve water-soluble heavy metals into solution. Thereafter, the insoluble solid residues are separated from the solution of heavy metals in a dewatering stage with the separated insoluble solid residues being removed from the dewatering stage to a storage station. The pH of the resulting solution is then corrected in a neutralizing stage for adapting the pH to the specific heavy metal impurities and hydroxides of the heavy metals are precipitated from the pH-adapted solution in a subsequent precipitation stage. Thereafter, a precipitating agent is added to the pH-adapted solution to form a mixture containing insoluble heavy metals.

In accordance with the invention, a heavy metal sludge precipitate is separated from the mixture by passing the mixture through a cross-current diaphragm filter in order to separate a purified liquid phase from the mixture. The solid phase which remains is then concentrated in a sedimentation stage while the purified liquid is removed from the filter.

In addition, the heavy metal sludge from the sedimentation stage is re-cycled to the dewatering stage to separate the insoluble heavy metals therein for delivery to the storage stage.

The method serves to improve the "discrimination" of filters when separating precipitated heavy metals while also providing a simplified technique for removing the heavy metals from the solid residues from a combustion plant. Thus, in a simple way, the precipitated solids containing heavy metals are separated from the solvent in a cross-current diaphragm filtration stage and the solids after filtration, are concentrated by sedimentation and dewatered together with the solids left after washing the residue, and are treated with additives to make them suitable for dumping.

Due to the use of known cross-current diaphragm filtration for separating the washing water from the precipitated heavy metal salts, it is possible, by selecting suitable filter diaphragms, to reduce the concentration of heavy metals in the "washing water" filtrate to practically any value. The treatment of ash residues containing heavy metals is greatly simplified by the joint dewatering and treatment of the two solid constituents occurring during the process, until they are ready for dumping.

Advantageously, the content of solids in the sedimentation sludge precipitate is concentrated from 2% to 20% weight/volume. Also, sedimentation has been found particularly efficient if the solid/liquid mixture for sedimentation is conveyed in an upstream or downstream flow to a round settling device via helical blades disposed in concentric cylindrical tubes such as described in Swiss Patent 585,062.

Under some circumstances it may be advantageous if proportions of reprecipitation chemicals, e.g. flocculation aids such as polyelectrolytes, are added to the solids to be dewatered.

Finally, the water needed for the method can be greatly reduced if the liquid from the residue dewatering unit and/or the filtrate are used as washing liquid and fed to the residue-washing stage.

The apparatus of the invention thus includes a washing stage, a dewatering stage, a store for receiving insoluble solid residues from a dewatering stage, a neutralizing stage, a flocculation reactor for precipitating heavy metal hydroxides, a precipitation stage, a sedimentation stage and a cross-current diaphragm filter.

As indicated above, the washing stage serves for washing the residues with water in order to dissolve water-soluble heavy metals therein and to produce a solution containing heavy metals.

The dewatering stage serves to separate insoluble solid residues from the solution of heavy metals.

The neutralizing stage adapts the pH of the solution containing heavy metals from the dewatering stage to specific heavy metal impurities while the flocculation reactor serves to precipitate heavy metal hydroxides from the pH-adapted solution.

The precipitation stage is located downstream of the reactor for the addition of a precipitating agent to the pH-adapted solution in order to form a mixture containing insoluble heavy metals.

The sedimentation stage serves for concentrating the heavy metal solid phase of the filtration. The sedimentation stage is also connected to the dewatering stage for recycling the heavy metal sludge precipitate to the dewatering stage.

The cross-current diaphragm filter serves to separate the mixture from the precipitation stage and/or from the sedimentation stage into purified water and a solid phase containing solid particles of heavy metal. The filter is also connected with the sedimentation stage for recycling the solid phase from the filter to the sedimentation stage.

BRIEF DESCRIPTION OF THE DRAWINGS

These and other objects and advantages of the invention will become more apparent from the following detailed description taken in conjunction with the accompanying drawing wherein:

The drawing illustrates a flow diagram of an apparatus employing a method in accordance with the invention.

Referring to the drawing, the apparatus is constructed so as to treat solid residues containing heavy metals from a combustion plant. In the following example, the fly ash of a garbage or dust-burning plant is treated. In this case, the heavy metals in the fly ash are in the form of compounds which are soluble in water or acid media and can be at least substantially converted into a form in which the heavy metal compounds are insoluble in water or acid media.

As illustrated, the apparatus includes a washing stage 1 in which water is fed in via a feed line 16 for washing the fly ash. As indicated, some of the water may be purified waste water from the process itself, for example, being fed in via lines 10, 17 as further explained below. In this washing stage 1, the heavy metal compounds which are soluble in water are washed out. The resulting suspension then comprises a solution containing dissolved heavy metals and insoluble solid residues. This suspension is then directed through a line 18 to a dewatering stage 2, e.g. a vacuum band filter, in which the suspension is dewatered and repeatedly washed if required. The washed solid residues leave the dewatering stage 2 in the form of filter cakes, are collected in an intermediate store 14, are compacted and made suitable for dumping in a dump area 15 of the plant, by adding binders such as concrete or bitumen, before being supplied to a "normal" dump.

The washing water contaminated with dissolved heavy metals and coming from the dewatering stage 2 is collected in a collector pipe 9 and supplied to a buffer/neutralization stage 3, where a first adjustment of pH to a value of 7.5 to 8.5 is made by adding calcium hydroxide $Ca(OH)_2$ or caustic soda (NaOH) via a feed line 19. If the heavy metal impurities in the washing water are relatively small in amount, some of the washing water, as already mentioned, can be recycled by line 10 to the ash-processing or residue-washing stage 1.

After neutralization, the washing water passes to a flocculation reactor 4 where some of the heavy metals are precipitated as hydroxides, after which calcium hydroxide or caustic soda solution is added via a feed line 20 and the pH is adapted to the specific metal impurities in the "individual" ash. In the present case, the pH is adjusted to 9.3 for the metals occurring in the fly ash under treatment and shown in the Table at the end of the description. The washing water and the previously-suspended solids flow from the flocculation reactor 4 to precipitation stage 5 in which solution of trimercapto-s-triazine trisodium salt, known commercially as "TMT 15" is added as a precipitating agent via a feed line 21.

The amount of precipitating agent depends on the heavy metal concentrations still permissible in the washing water after the heavy metals have been precipitated. In the present case, the amount is 15 wt. % TMT solution 50 ml per $m^3$ washing water. After leaving the precipitation reactor 5, the sludge/water mixture flows through a line 22 into a sedimentation stage which advantageously comprises a settling device as per Swiss Patent 585 062.

The liquid phase coming from the sedimentation stage 6 and still mixed with insoluble heavy-metal compounds flows to a known cross-current diaphragm filter 7, where the liquid flows through a number of tubular diaphragms and is pressed by excess pressure through the diaphragms transversely of the direction of flow, resulting in very thorough separation of purified liquid from a solid phase containing solid particles of heavy metal. The sedimentation stage 6 and filter 7 are connected by lines 12, 12a to a circulation system, so that the liquid mixed with flocks repeatedly flows through the filter 7 and the sedimentation stage 6. The lines 12, 12a leading from the sedimentation stage to the cross-current diaphragm filter and back can be constructed so that the sedimentation stage 6 is fed either up-current or down-current.

If the amount of the solid impurities in the mixture is relatively small, it is possible to separate the mixture in purified water and in a solid phase directly in the filter 7 without preceding sedimentation.

The filtrate from the filter 7, comprising substantially purified waste water, has three different possible uses i.e. concentration in an evaporator 8, recycling to the ash-processing or residue washing stage 1 through line 17 and/or discharge into drains through a line 13.

The sludge outlet from the sedimentation stage 6 is connected by a line 11 to the input side of the dewatering stage 2. The sedimented heavy-metal sludge concentrated to a concentration of 8% weight/volume unit of solids is returned to the dewatering stage 2 for additional joint dewatering and treatment with the solid residues from the residue-washing stage 1.

If required, flocculation aids (re-precipitation chemicals) such as polyelectrolytes can be added via a feed line 23 to the sludge suspension to be dewatered, e.g. in lines 18 and 11.

If the amount of the solid impurities in the mixture is relatively small it is possible to separate the mixture in purified water and in a solid phase directly in the filter 7 without preceding sedimentation.

The efficiency of the process is shown by the following Table, which gives the concentrations of some elements, mainly heavy metals, in the washing water at the inlet to the treatment plant, i.e. in line 18, and at the outlet, i.e. in line 13.

| ELEMENT | CONCENTRATION IN ppm | |
|---|---|---|
| | Line 18 | Line 13 |
| Cd | 14 | 0.1 |
| Pb | 44 | 0.2 |
| Zn | 40 | 0.34 |
| Hg | 0.4 | 0.002 |
| Ni | 1.8 | 0.5 |
| Cu | 0.4 | 0.2 |
| Cl | 32000 | 32000 |

The invention thus provides a method and apparatus of treating solid residues containing heavy metals in which the discrimination of the filter is adequate for separating precipitated heavy metals which have been rendered insoluble during treatment.

The invention further provides a relatively simple method and apparatus for removing water soluble or acid media-soluble heavy metals from solid residues coming from a combustion plant.

What is claimed is:

1. A method of treating solid residues containing heavy metals from combustion plants, said method comprising the steps of:

washing the residues with water in a washing stage to dissolve water-soluble compounds including heavy metals therein into solution;

thereafter separating insoluble solid residues from the solution of heavy metals in a dewatering stage;

removing the separated insoluble solid residues from the dewatering stage to a storage station;

correcting the pH of the solution containing heavy metals from the dewatering stage by adding at least one alkaline solution in a neutralizing stage to adapt the pH to the specific metal impurities;

precipitating hydroxides of the heavy metals from said pH-adapted solution in a precipitation stage;

thereafter adding a precipitating agent to the pH-adapted solution to form a mixture containing insoluble heavy metals;

separating a sludge containing heavy metal precipitate from the mixture by passing the mixture through a cross-current diaphragm filter in a filter stage to separate purified liquid from the mixture;

concentrating the dewatered mixture from the filter by a sedimentation stage while removing the purified liquid from the filter; and re-cycling the sludge containing heavy metals from the sedimentation stage to the dewatering stage to separate the insoluble heavy metals therein for delivery to the storage station.

2. A method as set forth in claim 1 which further comprises the step of separating a heavy metals precipitate from the mixture before passing said mixture through a filtration stage.

3. A method as set forth in claim 1 which further comprises the step of adding a binder to the heavy metals in the storage station for delivery to a dump.

4. A method as set forth in claim 1 wherein the solids content of the re-cycled sludge is from 2 to 20 % by weight per unit volume.

5. A method as set forth in claim 1 which further comprises the step of adding determined amounts of reprecipitation chemicals to the solution and/or to the sludge delivered to the dewatering stage.

6. A method as set forth in claim 1 which further comprises the step of re-cycling the purified liquid from the filter to the washing stage.

7. A method as set forth in claim 1 which further comprises the step of re-cycling at least a part of the water removed from the dewatering stage to the washing stage.

* * * * *

UNITED STATES PATENT AND TRADEMARK OFFICE
CERTIFICATE OF CORRECTION

PATENT NO. : 5,045,115
DATED      : September 3, 1991
INVENTOR(S) : Arnold Gmunder et al.

It is certified that error appears in the above-identified patent and that said Letters Patent is hereby corrected as shown below:

Column 3, line 66, change "solution" to --an aqueous solution--;

Column 4, lines 46-49, delete these lines in their entirety.

Signed and Sealed this

Eighth Day of March, 1994

Attest:

BRUCE LEHMAN

Attesting Officer

Commissioner of Patents and Trademarks